United States Patent
Eilert et al.

(10) Patent No.: US 7,866,535 B2
(45) Date of Patent: Jan. 11, 2011

(54) PREFORM FOR FORMING COMPLEX CONTOUR STRUCTURAL ASSEMBLIES

(75) Inventors: Theodore J. Eilert, Derby, KS (US); Henry D. Harkins, Garden Plain, KS (US); Roger E. Kornfeld, Whitewater, KS (US); Marlin D. Breer, Wichita, KS (US)

(73) Assignee: The Boeing Company, Chicago, IL (US)

( * ) Notice: Subject to any disclaimer, the term of this patent is extended or adjusted under 35 U.S.C. 154(b) by 8 days.

(21) Appl. No.: 12/176,779

(22) Filed: Jul. 21, 2008

(65) Prior Publication Data

US 2008/0280156 A1     Nov. 13, 2008

Related U.S. Application Data

(62) Division of application No. 11/085,707, filed on Mar. 21, 2005, now Pat. No. 7,431,196.

(51) Int. Cl.
*B23K 31/02*     (2006.01)
*B32B 7/00*      (2006.01)

(52) U.S. Cl. .................. 228/181; 228/193; 228/157; 428/542.8

(58) Field of Classification Search .................. 228/181, 228/193, 157; 428/593, 542.8, 543; 264/500, 264/570, 564, 511; 29/421.1; 72/709
See application file for complete search history.

(56) References Cited

U.S. PATENT DOCUMENTS

| | | |
|---|---|---|
| 3,011,926 A | 12/1961 | Rowe |
| 3,073,268 A | 1/1963 | Cole |
| 3,091,846 A | 6/1963 | Henry |
| 3,340,101 A | 9/1967 | Fields, Jr. et al. |
| 3,585,832 A | 6/1971 | Hinshaw et al. |
| 3,595,060 A | 7/1971 | Hundy |
| 3,864,176 A | 2/1975 | Swanson |
| 3,898,827 A | 8/1975 | Swanson |

(Continued)

OTHER PUBLICATIONS

*Hi-Tech Welding Services, Inc.* (*Services & Ti-Form Products*) available at http://www.hi-techwelding.com/default.htm (Mar. 17, 2005), 1 page.

(Continued)

*Primary Examiner*—Roy King
*Assistant Examiner*—Michael Aboagye
(74) *Attorney, Agent, or Firm*—Alston & Bird LLP (57) ABSTRACT

A preform for forming a structural assembly that defines a complex contour is provided. The preform and, hence, the structural assembly includes first and second skin members and a cellular core member between the first and second skin members. The skin members and/or the core member can be formed to a shape that corresponds to the desired contour of the structural member before the preform is assembled, e.g., by superplastic forming. That is, the first skin member can be disposed against a contour surface of a die to restrain the preform to the contour defined by the surface. A pressurized fluid is provided against the second skin member to urge the preform against the contour surface. A pressurized fluid is also injected in the first chamber to support the cellular core member. The preform is heated to a bonding temperature before or after being disposed against the contour surface so that the core and skin members are bonded to form the structural assembly.

10 Claims, 3 Drawing Sheets

U.S. PATENT DOCUMENTS

| | | | |
|---|---|---|---|
| 3,920,175 A | 11/1975 | Hamilton et al. | |
| 3,927,817 A | 12/1975 | Hamilton et al. | |
| 3,934,441 A | 1/1976 | Hamilton et al. | |
| 3,974,673 A | 8/1976 | Fosness et al. | |
| 3,997,369 A | 12/1976 | Grimes et al. | |
| 4,065,302 A | 12/1977 | Turillon | |
| 4,087,037 A * | 5/1978 | Schier et al. | 228/106 |
| 4,117,970 A * | 10/1978 | Hamilton et al. | 228/173.2 |
| 4,137,105 A | 1/1979 | Ness | |
| 4,145,903 A | 3/1979 | Leach et al. | |
| 4,197,977 A | 4/1980 | Deminet | |
| 4,292,375 A | 9/1981 | Ko | |
| 4,301,584 A * | 11/1981 | Dillner et al. | 29/889.71 |
| 4,304,350 A | 12/1981 | Paez et al. | |
| 4,304,821 A | 12/1981 | Hayase et al. | |
| 4,352,280 A | 10/1982 | Ghosh | |
| 4,361,262 A | 11/1982 | Israeli | |
| 4,407,682 A | 10/1983 | Sawa et al. | |
| 4,475,624 A | 10/1984 | Bourland, Jr. et al. | |
| 4,493,737 A | 1/1985 | Banker | |
| 4,587,147 A | 5/1986 | Keith | |
| 4,769,968 A | 9/1988 | Davis et al. | |
| 4,811,766 A | 3/1989 | Sastry et al. | |
| 4,811,890 A * | 3/1989 | Dowling et al. | 228/157 |
| 4,893,743 A | 1/1990 | Eylon et al. | |
| 4,934,580 A | 6/1990 | Sutton | |
| 5,016,805 A | 5/1991 | Cadwell | |
| 5,024,369 A | 6/1991 | Froes et al. | |
| 5,025,974 A | 6/1991 | Strickland | |
| 5,122,317 A | 6/1992 | Chen et al. | |
| 5,129,787 A | 7/1992 | Violette et al. | |
| 5,139,887 A | 8/1992 | Sutton | |
| 5,141,400 A | 8/1992 | Murphy et al. | |
| 5,143,276 A * | 9/1992 | Mansbridge et al. | 228/157 |
| 5,199,631 A | 4/1993 | Anderson et al. | |
| 5,204,161 A | 4/1993 | Petit et al. | |
| 5,209,093 A | 5/1993 | Cadwell | |
| 5,214,948 A | 6/1993 | Sanders et al. | |
| 5,214,949 A | 6/1993 | Cadwell | |
| 5,224,670 A | 7/1993 | Padden | |
| 5,226,982 A | 7/1993 | Eylon | |
| 5,240,376 A | 8/1993 | Velicki | |
| 5,273,837 A | 12/1993 | Aitken et al. | |
| 5,275,325 A | 1/1994 | Stracquadaini | |
| 5,287,918 A | 2/1994 | Banks et al. | |
| 5,297,937 A | 3/1994 | Umetani et al. | |
| 5,316,203 A | 5/1994 | Rowe et al. | |
| 5,343,619 A | 9/1994 | Lardellier | |
| 5,366,787 A | 11/1994 | Yasui et al. | |
| 5,384,959 A | 1/1995 | Velicki | |
| 5,399,215 A | 3/1995 | Blot et al. | |
| 5,407,326 A | 4/1995 | Lardellier | |
| 5,407,727 A | 4/1995 | Newell | |
| 5,410,132 A | 4/1995 | Gregg et al. | |
| 5,420,400 A | 5/1995 | Matsen | |
| 5,423,123 A * | 6/1995 | McQuilkin et al. | 29/897.32 |
| 5,435,226 A | 7/1995 | McQuilkin | |
| 5,451,377 A | 9/1995 | Asher et al. | |
| 5,467,528 A | 11/1995 | Bales et al. | |
| 5,467,626 A | 11/1995 | Sanders | |
| 5,518,383 A | 5/1996 | Abiven | |
| 5,556,565 A | 9/1996 | Kirkwood et al. | |
| 5,564,066 A | 10/1996 | Abiven | |
| 5,571,436 A | 11/1996 | Gregg et al. | |
| 5,587,098 A | 12/1996 | Matsen et al. | |
| 5,591,369 A | 1/1997 | Matsen et al. | |
| 5,591,370 A | 1/1997 | Matsen et al. | |
| 5,599,472 A | 2/1997 | Brown et al. | |
| 5,624,594 A | 4/1997 | Matsen et al. | |
| 5,641,422 A | 6/1997 | Matsen et al. | |
| 5,645,744 A | 7/1997 | Matsen et al. | |
| 5,654,518 A | 8/1997 | Dobbs | |
| 5,683,607 A | 11/1997 | Gillespie et al. | |
| 5,683,608 A | 11/1997 | Matsen et al. | |
| 5,688,426 A | 11/1997 | Kirkwood et al. | |
| 5,700,995 A | 12/1997 | Matsen | |
| 5,705,794 A | 1/1998 | Gillespie et al. | |
| 5,710,414 A | 1/1998 | Matsen et al. | |
| 5,715,644 A | 2/1998 | Yasui | |
| 5,723,225 A | 3/1998 | Yasui et al. | |
| 5,723,849 A | 3/1998 | Matsen et al. | |
| 5,725,355 A | 3/1998 | Crall et al. | |
| 5,728,309 A | 3/1998 | Matsen et al. | |
| 5,747,179 A | 5/1998 | Matsen et al. | |
| 5,793,024 A | 8/1998 | Matsen et al. | |
| 5,808,281 A | 9/1998 | Matsen et al. | |
| 5,821,506 A | 10/1998 | Matsen | |
| 5,823,034 A | 10/1998 | Nelepovitz | |
| 5,829,716 A | 11/1998 | Kirkwood et al. | |
| 5,841,079 A | 11/1998 | Parente | |
| 5,847,375 A | 12/1998 | Matsen et al. | |
| 5,914,064 A | 6/1999 | Gillespie et al. | |
| 5,981,415 A | 11/1999 | Waku et al. | |
| 6,040,563 A | 3/2000 | Matsen et al. | |
| 6,085,965 A | 7/2000 | Schwartz et al. | |
| 6,087,640 A | 7/2000 | Gillespie et al. | |
| 6,119,978 A | 9/2000 | Kobayashi et al. | |
| 6,144,008 A | 11/2000 | Rabinovich | |
| 6,180,932 B1 | 1/2001 | Matsen et al. | |
| 6,211,497 B1 | 4/2001 | Matsen et al. | |
| 6,264,880 B1 | 7/2001 | Elmer et al. | |
| 6,279,228 B1 | 8/2001 | Kobayashi et al. | |
| 6,337,471 B1 | 1/2002 | Kistner et al. | |
| 6,371,411 B1 | 4/2002 | Breer et al. | |
| 6,457,676 B1 | 10/2002 | Breer et al. | |
| 6,459,069 B1 | 10/2002 | Rabinovich | |
| 6,475,637 B1 | 11/2002 | Strutt et al. | |
| 6,511,759 B1 | 1/2003 | Schalansky | |
| 6,528,771 B1 | 3/2003 | Matsen et al. | |
| 6,582,845 B2 | 6/2003 | Helfinstine et al. | |
| 6,669,447 B2 | 12/2003 | Norris et al. | |
| 6,677,011 B2 | 1/2004 | Elmer et al. | |
| 6,688,558 B2 | 2/2004 | Breer et al. | |
| 6,758,388 B1 | 7/2004 | Leholm et al. | |
| 7,431,196 B2 * | 10/2008 | Eilert et al. | 228/181 |

OTHER PUBLICATIONS

Hi-Tech Welding Services, Inc. (*Hot Formed Products*) available at http://www.hi-techwelding.com/pg_tiform_superplas.htm (Mar. 17, 2005), 1 page.

Hi-Tech Welding Services, Inc. (*Vacuum Heat Treating*) available at http://www.hi-techwelding.com/pg_tiform_vacuum.htm (Mar. 17, 2005), 1 page.

* cited by examiner

_Fig. 1._

_Fig. 1A._

| | Time (Minutes) | | | Pressures (PSI Gauge) | | |
|---|---|---|---|---|---|---|
| Operation # | Ramp | Soak | Total elapsed time | P2 | P1 | Delta |
| Load | N/A | N/A | N/A | 0.00 | -0.20 | -0.20 |
| 1 | 15 | 0 | 15 | 14.00 | 13.40 | -0.60 |
| 2 | 1 | 120 | 136 | 14.00 | 13.60 | -0.40 |
| 3 | 1 | 143 | 280 | 14.00 | 13.82 | -0.20 |
| 4 | 15 | Unload | 295 | 0.00 | -0.20 | -0.20 |

PREFORM FOR FORMING COMPLEX CONTOUR STRUCTURAL ASSEMBLIES

CROSS-REFERENCE TO RELATED APPLICATION

This application is a divisional of U.S. patent application Ser. No. 11/085,707, filed Mar. 21, 2005 now U.S. Pat. No. 7,431,196, which is hereby incorporated herein in its entirety by reference.

BACKGROUND OF THE INVENTION

1. Field of the Invention

The present invention relates to structural assemblies and, more particularly, relates to a method and preform for forming a complex contour structural assembly.

2. Description of Related Art

Honeycomb panels are used in a variety of applications, especially where strength and minimum weight are required. A conventional honeycomb panel typically includes a core between first and second skins or face sheets. The core is a cellular member, i.e., the core defines a number of internal cells. In some cases, each cell is six-sided and extends in a longitudinal direction parallel to the other cells of the core. However, other cores can also be formed and used. Such panels can be formed of a variety of materials, including aluminum, titanium, and the like.

Metallic honeycomb panels are typically formed in a flat or gently contoured configuration. For example, in some cases, the core is formed from a flat sheet and bonded to the face sheets during a combined forming and bonding operation. In particular, the core and face sheets can be superplastically formed and diffusion bonded or brazed to form a flat or gently contoured honeycomb panel. Such forming and bonding operations are described in U.S. Pat. No. 4,117,970, entitled "Method for Fabrication of Honeycomb Structures," which issued on Oct. 3, 1978; U.S. Pat. No. 5,420,400, entitled "Combined Inductive Heating Cycle for Sequential Forming the Brazing," which issued on May 30, 1995; U.S. Pat. No. 5,700,995, entitled "Superplastically Formed Part," which issued on Dec. 23, 1997; U.S. Pat. No. 5,705,794, entitled "Combined Heating Cycles to Improve Efficiency in Inductive Heating Operations," which issued on Jan. 6, 1998; U.S. Pat. No. 5,914,064, entitled "Combined Cycle for Forming and Annealing" which issued on Jun. 22, 1999; and U.S. Pat. No. 6,337,471, entitled "Combined Superplastic Forming and Adhesive Bonding" which issued on Jan. 8, 2002.

In some cases, the honeycomb panel can then be formed to a contoured shape, i.e., so that each of the face sheets define a two- or three-dimensional curve. The degree of contour that can be imparted to such a structural panel is dependent on such factors as the size and configuration of the panel, the material properties of the panel, the type of forming process, and the like. If excessively formed, undesirable changes in the configuration of the panel may result, such as crushing of the core, buckling of the face sheets, or destruction of the joints between the core and face sheets.

The structural assemblies for some applications define complex contours that are difficult or impossible to form by conventional manufacturing methods. For example, U.S. Pat. No. 6,371,411, issued Apr. 16, 2002, U.S. Pat. No. 6,457,676, issued Oct. 1, 2002, and U.S. Pat. No. 6,688,558, issued Feb. 10, 2004, each titled "Method and apparatus for aircraft inlet ice protection," describe an ice protection system for an inlet for an aircraft engine, which inlet can be partially lined with a honeycomb core sandwiched between sheets, thereby improving the acoustic attenuation of the inlet. In some cases, the core is provided in multiple portions, in part, to facilitate manufacture.

Thus, there exists a need for an improved method and preform for producing metallic complex contour structural assemblies, including contours not typically formable by conventional methods. The method should be capable of producing structural assemblies with cellular cores and should be compatible with superplastically formable materials such as titanium.

SUMMARY OF THE INVENTION

The present invention provides a method and preform for forming a structural assembly that defines a complex contour. The preform and, hence, the structural assembly includes first and second skin members and a cellular core member between the skin members. The skin members and/or the core member can be formed to a shape that corresponds to the desired contour of the structural member before the preform is assembled, e.g., by superplastic forming. Thus, complex contours that would be difficult or impossible to form from a flat preform can be produced.

According to one embodiment of the present invention, the core member is disposed between the skin members, and a periphery of the skin members is connected to define a first gas chamber between the skin members. A closeout member can be connected to the second skin member opposite the first skin member to define a second chamber. The first skin member is then disposed against a contour surface of a die, thereby restraining the preform to the contour of the surface, and a pressurized fluid is provided against the second skin member to urge the preform against the contour surface, e.g., by injecting a pressurized fluid in the second chamber. A pressurized fluid is also injected in the first chamber to support the cellular core member. The preform is heated to a bonding temperature before or after being disposed against the contour surface so that the core and skin members are bonded to form the structural assembly.

The pressure provided against the second skin member for urging the preform against the contour surface can be greater than the pressure provided in the first chamber. For example, a pressure of at least about 10 psi can be provided against the second skin member, and the pressure in the first chamber can be about 0 and 1 psi less than the pressure provided against the second skin member. The preform can be heated to a diffusion bonding temperature of the preform to thereby diffusion bond the core member to the skin members. Alternatively, a braze material can be provided between the core member and the skin members, and the preform can be heated to a brazing temperature of the braze material so that the core member is brazed to the skin members.

According to one embodiment of the present invention, the closeout member is formed of a cellular core member between contour skin members. Thus, the closeout member can be restrained against a second contour die surface while the core member of the closeout member is bonded to the skin members of the closeout member, e.g., so that the closeout member can be used to form a structural assembly having desired dimensions. After bonding, the preform can be trimmed to form one or more structural assemblies. The dies surface(s) for restraining the preform can be defined by first and second dies, which can be closed to form a die cavity. In some cases, the die cavity can be substantially sealed and a partial vacuum can be formed in the cavity.

The present invention according to another embodiment provides a preform for forming a structural assembly defining a complex contour. The preform includes first and second contour skin members, each defining a contour corresponding to the structural assembly. The skin members are connected to define a first gas chamber, with a core member disposed in the gas chamber. A closeout member is connected to the second skin member and defines a second gas chamber. A first gas connection in fluid communication with the first chamber is configured to deliver a pressurized fluid to the first chamber for supporting the core member. A second gas connection in fluid communication with the second chamber is configured to deliver a pressurized fluid to the second chamber to urge the preform against a contour surface of a die. The skin members can be superplastically formed, and the skin members and/or the core member can be formed of similar or dissimilar materials, including titanium. The core member can be bonded to the skin members by diffusion bonds or braze joints.

In one embodiment, the closeout member includes third and fourth contour skin members that are connected to define a third gas chamber with a core member disposed in the third gas chamber. The third and fourth skin members are joined to the first and second skin members to form the second gas chamber between the first and third skin members. Thus, the first and second skin members can be separated from the third and fourth skin members to form two structural assemblies.

BRIEF DESCRIPTION OF THE DRAWINGS

The foregoing and other advantages and features of the invention, and the manner in which the same are accomplished, will become more readily apparent upon consideration of the following detail description of the invention taken in conjunction with the accompanying drawings, which illustrate preferred and exemplary embodiments and which are not necessarily drawn to scale, wherein.

DETAILED DESCRIPTION OF THE INVENTION

The present invention now will be described more fully with reference to the accompanying drawings, in which some, but not all embodiments of the invention are shown. This invention may be embodied in many different forms and should not be construed as limited to the embodiments set forth. Like numbers refer to like elements throughout.

Figure 1:
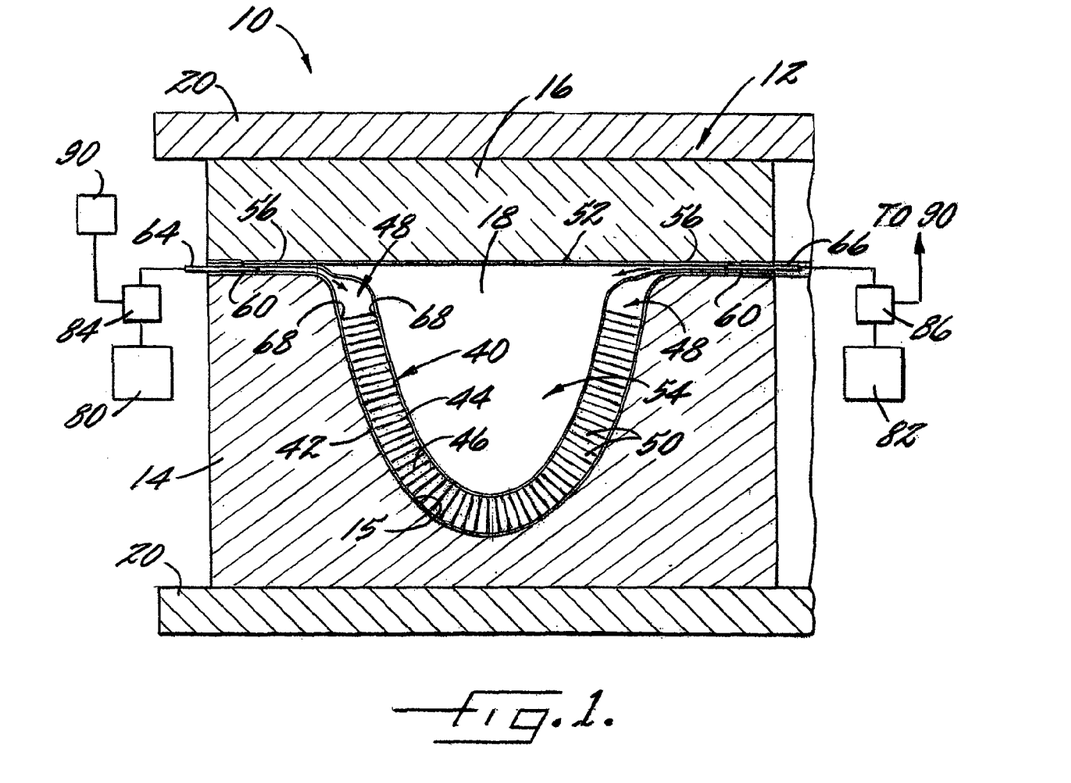
FIG. 1 is a section view illustrating a system including a die set for manufacturing a structural assembly using a preform according to one embodiment of the present invention.
Figures 4, 5:
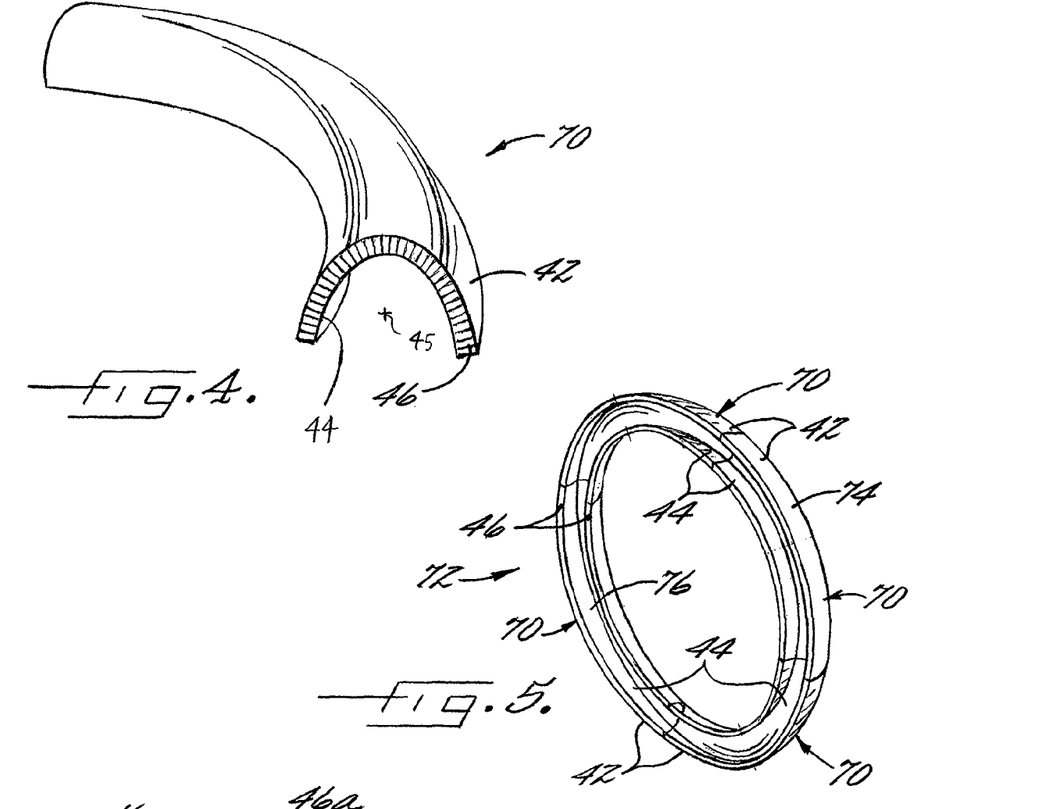
FIG. 4 is a perspective view illustrating a structural assembly according to one embodiment of the present invention.
FIG. 5 is a perspective view illustrating an inlet lip for an aircraft engine formed of four of the structural assemblies of FIG. 4.

Referring now to the drawings, and in particular to FIG. 1, there is shown a system 10 according to one embodiment of the present invention, which can be used to form a structural assembly from a preform. In particular, the preform 40 illustrated in FIG. 1 can be used to manufacture the monolithic structural assembly 70 that is illustrated in FIG. 4, which can be a lip or a portion of a lip for a nacelle. The structural assemblies according to the present invention can define various contours and configurations. In particular, the structural assemblies can define complex contours, such as contours that include one or more two- or three-dimensional curves. The structural assemblies can be used in a variety of industries and applications including, but not limited, in connection with the manufacture of aircraft and other aerospace structures and vehicles. Further, the structural assemblies can be used individually or in combination with other structures and devices.

The system 10 illustrated in FIG. 1 includes a die set 12 having first and second dies 14, 16, which cooperatively define a die cavity 18. The die set 12 is configured to be adjusted between open and closed positions so that the die cavity 18 can be opened to receive the preform 40 and then closed during the forming operation. For example, the second die 16 can be lifted from the first die 14, or the first die 14 can be lowered relative to the second die 16. In other embodiments of the present invention, the dies 14, 16 can be configured in a horizontal configuration such that one or both of the dies 14, 16 can be moved horizontally to open the die cavity 18. A support structure 20 such as a hydraulic press can be provided for clamping the die set 12 in the closed position, e.g., by pressing the dies 14, 16 together or otherwise securing the dies 14, 16 in the closed position. The hydraulic press or other support structure 20 should be capable of maintaining the position of the dies 14, 16 while internal pressures are achieved in the die cavity 18.

The dies 14, 16 can be formed of a variety of materials including, e.g., ceramic, metals, and the like. For example, in the embodiment illustrated in FIG. 1, the first die 14 is formed of a cast ceramic with a low thermal expansion and a high thermal insulation. The second die 16 is formed of a high temperature alloy of stainless steel. The additional support structure 20 can also be provided to maintain the shape of the dies 14, 16 and prevent damage to the dies during operation and handling, such as is described in U.S. Pat. No. 5,683,608, entitled "Ceramic Die for Induction Heating Work Cells," which issued on Nov. 4, 1997, and U.S. Pat. No. 6,528,771, entitled "System and Method for Controlling an Induction Heating Process," which issued Mar. 4, 2003, both of which are assigned to the assignee of the present invention, and the entirety of each of which is incorporated by reference. While the dies 14, 16 are described to be formed of different materials in the foregoing examples, the dies 14, 16 may be formed of the same material in other embodiments.

The die set 12 can be heated before or after the preform 40 is disposed in the die cavity 18. For example, the die set 12 can be disposed in an oven or other heating device before or after the preform 40 is loaded into the die cavity 18. Alternatively, the system 10 can include a heater, such as a heater that is integral to the die set 12, as described in assignee's copending patent application titled "System and Method for Processing a Preform in Vacuum Vessel to Produce a Structural Assembly," U.S. patent application Ser. No. 11/085,708, which is filed concurrently and the entirety of which is incorporated by reference. In some cases, the die set 12 can be disposed in a closed vessel that is configured to be at least partially evacuated to provide a partial vacuum for forming. Such a vacuum vessel is also described in "System and Method for Processing a Preform in Vacuum Vessel to Produce a Structural Assembly," filed concurrently.

As illustrated in FIG. 1, the preform 40 includes first and second skin members 42, 44, or face sheets, with a cellular core member 46 between the skin members. The first and second skin members 42, 44 can define various contours and configurations according to the intended application of the finished structural assembly 70. In particular, each of the skin members 42, 44 can define a complex contour, which can include one or more two- or three-dimensional curves or angles. In some cases, the skin members 42, 44 can be formed by superplastic forming before assembly of the preform 40. That is, each skin member 42, 44 can be heated to its superplastic forming temperature and formed to a desired shape prior to assembly of the preform 40.

Superplastic forming ("SPF") generally refers to a process for forming plastics and metals, including titanium, aluminum, and alloys of such metals, that exhibit superplastic behavior at certain temperatures, i.e., large elongations (of 2000% or more). The SPF process can be used for forming a single SPF sheet or an SPF pack that includes multiple layered sheets. During the SPF process, the SPF sheet or pack is placed into a shaping die and heated to a sufficiently high temperature within the superplasticity range of the material to soften the material. Pressurized heated gas is then injected against the material, and possibly into the pack, if applicable, thereby causing the sheet or pack to be urged against the die. In some cases, the portions of the sheets brought into contact during the forming are bonded or brazed together under the forming or post-forming conditions. The formed sheet or pack is then cooled and removed from the die and final machining steps are performed, such as edge trimming. Advantageously, the SPF process can be used to form structures that can satisfy narrow shape and tolerance requirements without substantial additional machining. Such SPF and combined SPF-bonding cycles are described in U.S. Pat. No. 4,117,970, entitled "Method for Fabrication of Honeycomb Structures," which issued on Oct. 3, 1978; U.S. Pat. No. 5,410,132, entitled "Superplastic Forming Using Induction Heating," which issued on Apr. 25, 1995; U.S. Pat. No. 5,420,400, entitled "Combined Inductive Heating Cycle for Sequential Forming the Brazing," which issued on May 30, 1995; U.S. Pat. No. 5,700,995, entitled "Superplastically Formed Part," which issued on Dec. 23, 1997; U.S. Pat. No. 5,705,794, entitled "Combined Heating Cycles to Improve Efficiency in Inductive Heating Operations," which issued on Jan. 6, 1998; U.S. Pat. No. 5,914,064, entitled "Combined Cycle for Forming and Annealing" which issued on Jun. 22, 1999; and U.S. Pat. No. 6,337,471, entitled "Combined Superplastic Forming and Adhesive Bonding" which issued on Jan. 8, 2002, each of which is assigned to the assignee of the present invention, and the entirety of each of which is incorporated by reference.

Alternatively, the skin members 42, 44 can be formed by other conventional forming processes. However, superplastic forming can produce shapes that are difficult or impossible to form using some other forming techniques. In any case, the skin members 42, 44 can substantially define the desired contours of the finished structural assembly 70 so that no forming, or minimal forming, of the skin members 42, 44 is required after the preform 40 is assembled. That is, the shape of the preform 40 can substantially correspond to the finished shape of the structural assembly 70 so that the shape of the preform 40 must only be maintained during the subsequent bonding operation. In particular, the skin members 42, 44 can define deeply contoured curves, such as is illustrated in FIG. 1, which may be difficult or impossible to form after assembly of the preform 40. For example, the first skin member 42 can define a convex contour that corresponds to a first surface of the finished structural assembly 70, and the second skin member 44 can define a concave contour that corresponds to an opposite, second surface of the structural assembly 70.

During assembly of the preform 40, the skin members 42, 44 are disposed with the cellular core member 46 between the skin members. That is, the skin members 42, 44 are disposed on opposite sides of the core member 46 so that the core member 46 is disposed in a first chamber 48 defined between the skin members 42, 44. The cellular core 46 member typically has a honeycomb configuration that defines a plurality of parallel six-sided cells 50, each extending in a longitudinal direction substantially parallel to the adjacent cells 50, though other cellular configurations can alternatively be formed. The core member 46 can be a flexible structure, i.e., so that the core member 46 can be bent to the configuration of the skin members 42, 44 without crushing the cells 50. Thus, the core member 46 can be formed at least approximately to the configuration of the preform 40 before assembly of the preform 40, e.g., by a roll forming process. Alternatively, the core member 46 can be constructed in the configuration of the preform 40 so that no subsequent forming is required before assembly of the preform 40.

Figure 6:
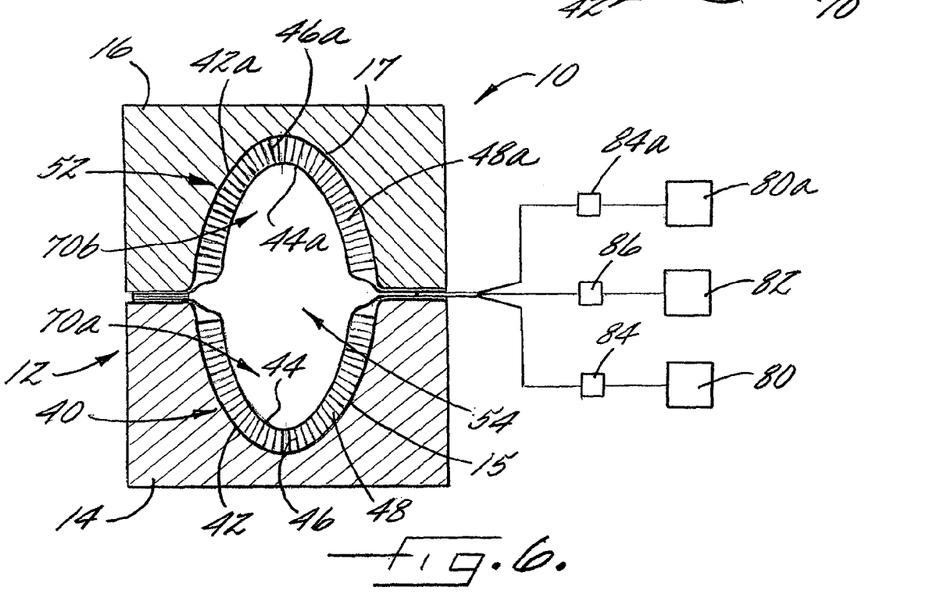
FIG. 6 is a section view illustrating a die for manufacturing two structural assemblies from a preform according to another embodiment of the present invention.

The preform 40 also includes a closeout member 52, i.e., a member disposed partially against the second skin member 44 opposite from the first skin member 42. The closeout member 52 can be a removable member that is provided during formation of the assembly 70 and then removed. As shown in FIG. 1, the closeout member 52 can be a flat sheet, such that the closeout member 52 and the second skin member 44 define a second chamber 54. In other embodiments of the present invention, the closeout member 52 can have other configurations, such as the shape of an additional structural assembly, as described below in connection with FIG. 6.

The skin members 42, 44, cellular core member 46, and the closeout member 52 can be formed of various materials including, but not limited to, aluminum, titanium, alloys that include aluminum or titanium, and the like. Further, the members 42, 44, 46, 52 can be formed of similar or dissimilar materials. For example, according to one embodiment of the present invention, the skin members 42, 44 can each be formed of Ti-6Al-4V, and the core member 46 can be formed of Ti-3Al-2.5V. If the closeout member 52 is to be removed from the finished assembly 70 and discarded or recycled after bonding by the system 10, the closeout member 52 can be formed of a variety of cost-efficient materials that can be sufficiently bonded to the rest of the preform 40. The particular materials to be used for each member 42, 44, 46, 52 can be selected to facilitate the manufacture of the assembly 70 and to provide in the finished assembly 70 the desired material properties and characteristics including strength, corrosion resistance, and the like.

Figure 2:
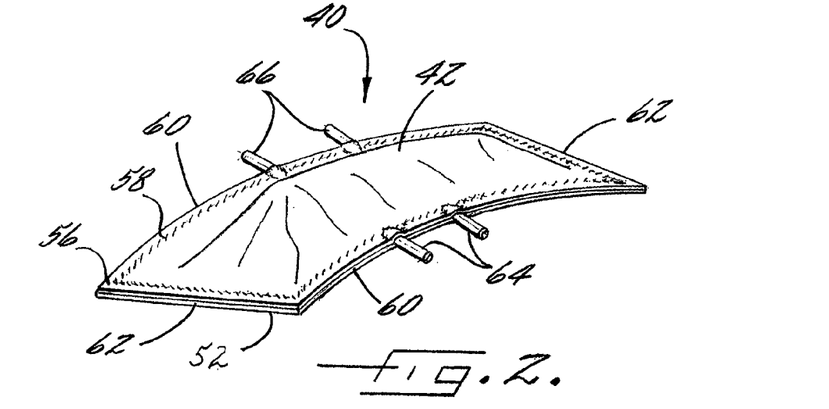
FIG. 2 is a perspective view illustrating the preform of FIG. 1.
Figure 2A:
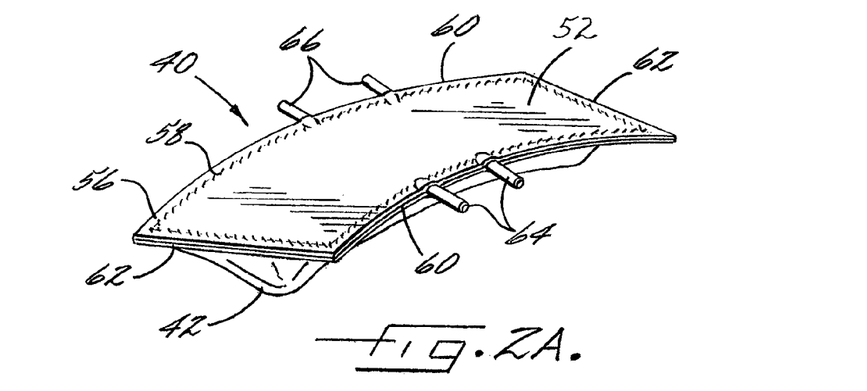
FIG. 2A is another perspective view illustrating the preform of FIG. 1.

The members 42, 44, 46, 52 are connected in the desired configuration to form the preform 40. For example, with the cellular core member 46 disposed between the first and second skin members 42, 44, the skin members 42, 44 and the closeout member 52 can be clamped in place and then connected at a periphery 56 by a weld joint 58 as shown in FIGS. 2 and 2A. That is, a substantially continuous weld joint 58 can be formed along the transverse edges 60 and the longitudinal edges 62 of the members 42, 44, 52. The weld joint 58 can be formed by various welding processes, including resistance seam welding, friction stir welding or other types of friction welding, fusion welding, gas arc welding, and the like. In any case, one or more gas connections 64, 66 can be formed through the weld joint 58, for example, by providing tubes, pipes, or other ports extending to the internal chambers 48, 54 of the preform 40 so that the chambers 48, 54 between the members 42, 44, 52 are otherwise substantially sealed gas chambers. In particular, first gas connections 64 can be provided in fluid communication with the first gas chamber 48, and second gas connections 66 can be provided in fluid communication with the second gas chamber 54. The tubes that provide the gas connections can be fusion welded or otherwise joined to the preform 40.

Figure 1A:
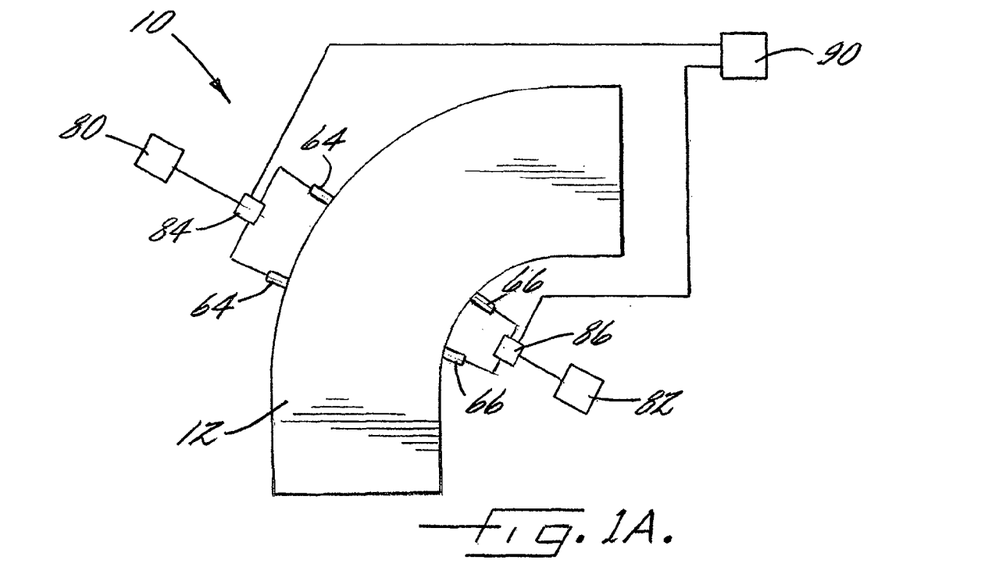
FIG. 1A is a plan view illustrating the system of FIG. 1.

Referring again to FIG. 1, the preform 40 is placed in the die cavity 18 with the first skin member 42 disposed against the first die 14 and the closeout member 52 disposed against the second die 16. In some cases, a parting agent such as boron nitride can be coated on the outer surfaces of the members 42, 52 and/or the inner surfaces of the dies 14, 16. The first die 14 typically defines a contour surface 15 that corresponds to the desired shape of the structural assembly 70 and, hence, the contour of the first skin member 42. The first and second gas chambers 48, 54 are fluidly connected to one or more sources 80, 82 for pressurized fluid, as shown in FIG. 1A, typically using stainless steel tubing. By providing pressurized fluid to the chambers 48, 54 through the gas connections 64, 66, the various members of the preform 40 can be urged together to form bonds. Multiple gas connections 64, 66 can be provided for each chamber 48, 54, e.g., so that fluid can be supplied through one of the gas connections 64, 66, and the pressure in each chamber 48, 54 can be sensed or detected through another one of the connections 64, 66.

According to one method of the present invention, the preform 40 is assembled, such that the skin members 42, 44 and closeout member 52 are connected and the gas chambers 48, 54 are substantially sealed except for the gas connections 64, 66. The preform 40 is placed in the die cavity 18, and the die set 12 is adjusted to a closed position as shown in FIG. 1 so that the first skin member 42 is disposed against the contour surface 15 of the first die 14, and the closeout member 52 is disposed against the second die 16. The dies 14, 16 are secured in this position, e.g., by urging the two dies 14, 16 together with a hydraulic ram or otherwise securing the dies 14, 16. The die set 12 and/or the preform 40 can be heated before or after the preform 40 is disposed in the die set 12. In particular, the preform 40 can be heated to a temperature at which diffusion bonding or brazing of at least some of the members 42, 44, 46, 52 can be performed. For example, the die set 12 can be heated in a furnace before or after the preform 40 is placed in the die set. Alternatively, the preform 40 can be heated using a heater that is integral to the die set 12, or the preform 40 can be heated by providing an electromagnetic field that induces an electric current in the preform 40 or in a separate susceptor member disposed in thermal communication with the preform 40. The use of such susceptors for heating preforms in a die is further described in U.S. Pat. Nos. 5,705,794; 5,914,064; and 6,337,471, noted above.

The temperature to which the preform 40 is heated can be determined according to the type of material of the preform 40, the type of bonding to be performed, and the like. For example, titanium typically can be superplastically formed and diffusion bonded at a temperature of between about 1600° and 1700° F. For other materials and other forming and bonding operations, a higher or lower temperature can be provided.

Pressurized fluid is also delivered to the gas chambers 48, 54 of the preform 40 to achieve the required contact between the members 42, 44, 46, 52 of the preform 40 for bonding. For example, as shown in FIG. 1A, first and second pressurized gas sources 80, 82 can be connected to the first and second gas chambers 48, 54, respectively, via pressure regulation devices 84, 86 that are configured to separately control the pressure in each chamber 48, 54. While separate gas sources 80, 82 are illustrated, a single source can instead be configured to pressurize both of the chambers 48, 54 via one or more pressure regulation devices. In some cases, the gas in the die cavity 18 in and around the gas chambers 48, 54 of the preform 40 can be purged by repeatedly vacuuming gas from the die cavity 18 and refilling the die cavity 18 (including the chambers 48, 54) with an inert gas such as argon. Then, the second gas source 82 can deliver a pressure to the second gas chamber 54, thereby expanding the chamber 54 and urging the closeout member 52 and second skin member 44 outward. The second skin member 44 is urged toward the first skin member 42 and, thus, against the core member 46, and the first skin member 42 is urged against the contour surface 15 of the first die 14. Thus, the preform 40 is held against the contour surface 15 and, hence, maintained in the desired configuration of the structural assembly 70 during the bonding operation. In fact, if the preform 40 does not conform to the contour of the surface 15 when placed in the die cavity 18, the preform 40 can be formed against the contour surface 15 and thereby formed to the desired configuration of the structural assembly 70. Further, by virtue of the pressure in the second chamber 54, the core member 46 is compressed between the first and second skin members 42, 44 and can thus be joined by diffusion bonding or brazing.

The first pressurized gas source 80 can deliver a pressure to the first gas chamber, e.g., to resist crushing or other damage to the core member 46. Generally, the pressure in the first gas chamber 48 is lower than the pressure in the second gas chamber 54 so that the second skin member 44 is pressed against the core member 46. That is, a pressure differential between the first and second gas chambers 46, 54 is used to control the amount of compressive force applied to the core member 46. This technique enhances the ability to achieve intimate contact between the skin and core members 42, 44, 46, even if each of the members 42, 44, 46 defines a complex shape, while maintaining the form of the preform 40 by compressing it against the contour surface 15 of the die 14.

For example, a controller 90, such as a computer, programmable logic device, or other processor, can be provided for controlling the bonding operation. In particular, the controller 90 can be configured to communicate electrically with the gas source(s) 80, 82 and/or the regulation device(s) 84, 86 to control the pressure in the two chambers 48, 54 of the preform 40. For example, the controller 90 can increase the pressure in the second gas chamber 54 while maintaining no more than a maximum differential relative to the pressure in the first gas chamber 48, such as a differential of about 0.40 psi or 0.60 psi greater than the pressure in the first gas chamber 48.

As a result, the preform 40 is sufficiently urged against the contour surface 15 of the die 14 for restraining the preform 40 to the desired shape. Further, the skin members 42, 44 are put in sufficient contact with the core member 46 to achieve bonding without the core member 46 being crushed between the skin members 42, 44.

As noted above, the skin members 42, 44 can be joined to the core member 46 by diffusion bonding or brazing. Diffusion bonding generally refers to a bonding operation in which the members to be bonded are heated to a temperature less than the melting temperature of each member and pressed in intimate contact to form a bond between the members. Brazing generally refers to a bonding operation in which a braze material is provided between the members that are to be joined, and the members and braze material are heated to a temperature higher than the melting temperature of the braze material but lower than the melting temperature of the members being joined. Thus, a diffusion bond can be formed between the core member 46 and the skin members 42, 44 of the preform 40 by heating the members 42, 44, 46 and urging them together with sufficient pressure in the gas chambers 48, 54. Brazing can be performed similarly, but generally requires that an additional braze material 68 be provided between the members 42, 44, 46, e.g., at the interface of the core member 46 and the skin members 42, 44 as indicated in FIG. 1. The braze material 68 can be selectively provided where joints are to be formed, or the braze material 68 can be provided nonselectively between the members 42, 44, 46 to be joined. For example, the braze material 68 can be provided as a sheet of material between the members 42, 44, 46, as a powder disposed between the members 42, 44, 46, by plating the braze material 68 on the surface of one or more of the members 42, 44, 46, or otherwise.

Figure 3:
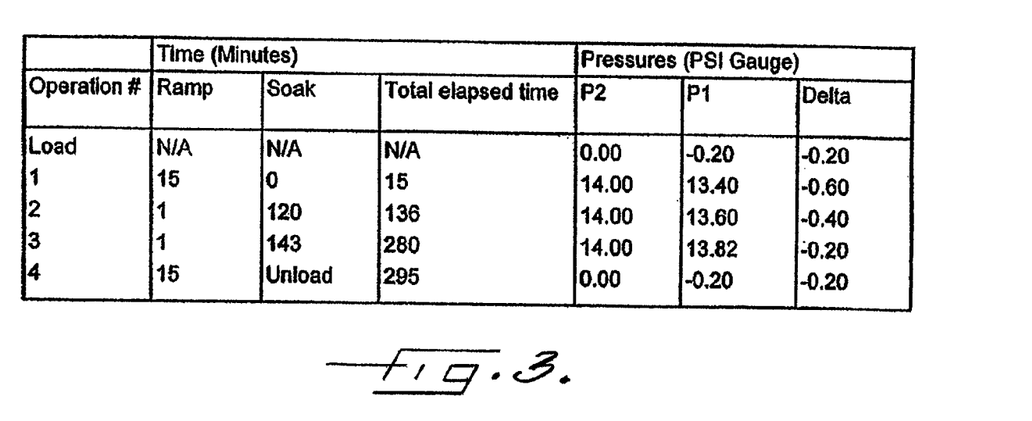
FIG. 3 is a chart indicating the variation in pressure provided in the preform during a bonding process according to one embodiment of the present invention.

The variations in pressure provided in the gas chambers 48, 54 of the preform 40 during one exemplary bonding process are illustrated in FIG. 3. In the "Load" operation, the preform 40 is loaded into the die set 12 as described above. The initial pressure (P2) in the second chamber 54 between the second skin member 44 and the closeout member 52 is set to about 0 psi, i.e., atmospheric pressure, and the initial pressure (P1) in the first chamber 48 between the skin members 42, 44 is set to about −0.20 psi. During each subsequent operation, the pressures P1, P2 are adjusted to new values during a "Ramp" time and held at the new pressures for a "Soak" time. For example, during operation #1, the pressure P2 in the second chamber 54 is increased to 14 psi during a ramp period of 15 minutes. Then, the pressure P2 is maintained for 263 minutes, until the start of operation #4, thereby pressing the skin members 42, 44 against the core member 46 and pressing the first skin member 42 against the contour surface 15 of the first die 14. Meanwhile, during operation #1, the first pressure P1 in the first chamber 48 is increased to 13.40 psi during the first 15-minute ramp period. During operation #2, the first pressure P1 is increased to 13.60 psi during a 1 minute ramp period and then held for 120 minutes. During operation #3, the first pressure P1 is further increased to 13.82 psi and held at that pressure for 143 minutes. In operation #4, the first pressure P1 is reduced back to −0.20 psi during a ramp period of 15 minutes.

It can be seen that the difference between the pressures P1, P2 in the two gas chambers 48, 54 can be limited, even while the pressures in either or both of the chambers 48, 54 fluctuate. For example, in the illustrated embodiment of FIG. 3, the second pressure P2 is higher than the first pressure P1 throughout the bonding process; however, the second pressure P2 does not exceed the first pressure P1 by more than 0.60 psi at any time during the process. The particular difference in the pressures P1, P2 can be achieved to sufficiently bond the skin members 42, 44 to the core member 46 while avoiding crushing of the cells 50 of the core member 46. The overall pressures P1, P2 can be selected to provide a sufficient force between the preform 40 and the first die 14 so that the preform 40 is constrained to the contour of the surface 15 during bonding. In addition, one or both of the chambers 48, 54 can be evacuated during forming to provide the necessary forces on the preform 40. For example, the first chamber 48 can be partially evacuated to form a partial vacuum in the chamber 48, thereby providing a pressure differential with the second chamber 54. In some cases, a pressure in the second chamber 54 of about atmospheric pressure may be sufficient.

After the bonding operation is complete, the preform 40 can be removed from the die cavity 18, typically after the preform 40 is at least partially cooled in the die set 12 to prevent distortion of the preform 40 during or after removal. Depending on the material of the preform 40, it may be possible to remove the preform 40 with little cooling in the die set 12. Regardless of whether the preform 40 is cooled in or out of the die cavity 18, the rate of cooling of the preform 40 can be controlled. For example, the system 10 can include a device for cooling the dies 14, 16 and, hence, the preform 40, such as a pump for circulating a coolant fluid through passages defined by the dies 14, 16. Such a cooling operation is described, e.g., in U.S. Pat. No. 6,528,771, noted above. If the preform 40 is removed from the die set 12 while hot, the preform 40 can be wrapped in blankets or otherwise insulated to limit the rate of cooling. Alternatively, the rate of convective cooling of the preform 40 can be enhanced by inducing air circulation proximate the preform 40.

The preform 40 can also be machined or otherwise trimmed to the desired configuration of the structural assembly 70. In particular, the closeout member 52 can be trimmed from the preform 40 and/or the welded peripheral portions 56 of the members 42, 44 can be removed from the preform 40. For example, the preform 40 of FIGS. 1, 2, and 2A can be machined to form the monolithic structural assembly 70 shown in FIG. 4. As illustrated in FIG. 4, the structural assembly 70 defines a three-dimensionally curved contour, i.e., a contour curved about at least two non-parallel axes. In particular, the structural assembly 70 illustrated in FIG. 4 has a cross section that defines a generally C-shaped curve having a radial center 45, and the center 45 defines a centerline that extends along an arc of 90°. In other embodiments, the center 45 can extend through an arc that is lesser or greater, including a 360° arc. Further, the arc defined by the centerline of the assembly can be circular or non-circular.

In some cases, the structural assembly 70 can be further assembled with other similar structural assemblies. For example, FIG. 5 illustrates an inlet lip 72 for a nacelle of an aircraft engine formed of four of the structural assemblies 70 of FIG. 4. That is, the four structural assemblies 70 can be welded or otherwise joined to form the inlet lip 72 such that the inlet lip 72 has a continuous convex outer mold line surface 74, defined by the first skin members 42 of the structural assemblies 70, and a continuous concave inner mold line surface 76, defined by the second skin members 44 of the structural assemblies 70. The cellular core members 46, which are disposed between the outer and inner mold line surfaces 74, 76, can provide increased acoustic attenuation and/or can be used to transmit and direct hot gas to reduce ice formation on the inlet, as described in U.S. Pat. No. 6,371, 411, issued Apr. 16, 2002; U.S. Pat. No. 6,457,676, issued Oct. 1, 2002; and U.S. Pat. No. 6,688,558, issued Feb. 10, 2004, each of which is titled "Method and apparatus for aircraft inlet ice protection," each of which is assigned to the assignee of the present invention, and the entirety of each of which is incorporated by reference.

The closeout member 52 of the preform 40 illustrated in FIGS. 2 and 2A is removed after bonding to produce the structural assembly 70 of FIG. 4. According to other embodiments of the present invention, the closeout member 52 can instead be bonded, formed, or otherwise processed during treatment of the preform 40 and used to produce a structural assembly. In this regard, the preform 40 illustrated in FIG. 6 includes a closeout member that includes two skin members 42a, 44a and a core member 46a configured similar to the skin and core members 42, 44, 46. In fact, the third and fourth skin members 42a, 44a and core member 46a of the closeout member 52 can have a configuration that is similar or dissimilar to the first and second skin members 42, 44 and core member 46. Further, the second die 16 can define a contour surface 17 that corresponds to the shape of the fourth skin member 44a and defines a desired contour of the structural assembly 70. In this way, the preform 40 can define three gas chambers, i.e., a third gas chamber 48a between the third and fourth skin members 42a, 44a, in addition to the first and second gas chambers 48, 54. A gas connection to the third gas chamber 48a can be provided so that the third chamber 48a can be pressurized independently of the first and second chambers 48, 54. During processing, the third gas chamber 48a can be pressurized to a pressure similar to the pressure in the first chamber 48. That is, the first and third chambers 48, 48a can be pressurized to prevent crushing of the core members 46, 46a using sources 80, 80a and regulation devices 84, 84a or a single source and regulation device. Meanwhile the second chamber 54 can be pressurized, typically to a greater pressure, to urge the first and third skin members 42, 42a against the respective contour surfaces 15, 17 of the dies 14, 16 and urge the skin members 42, 44, 42a, 44a against the respective core members 46, 46a to form bonds between the skin and core members.

The preform 40 can then be removed from the die cavity 18, and two structural assemblies 70 can be formed from the preform 40. That is, a first structural assembly, similar to the one illustrated in FIG. 4, can be formed from portion 70a of the preform 40 including the first and second skin members 42, 44 and the core member 46. Similarly, a second structural assembly, which can also be similar to the one illustrated in FIG. 4, can be trimmed from portion 70b of the preform 40 that includes the third and fourth skin members 42a, 44a and the core member 46a. In other embodiments, any number of structural assemblies can be formed from a single preform. In some cases, the combined manufacture of multiple structural assemblies can reduce the amount of scrap material, i.e., material that is trimmed from the preform and does not constitute part of the finished structural assembly. That is, the preform 40 of FIG. 6 can be used to form two structural assemblies 70 without trimming from the preform 40 a flat closeout sheet, such as the one illustrated in FIGS. 2 and 2A, which is not part of the finished structural assembly 70.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed, they are used in a generic and descriptive sense only and not for purposes of limitation.

What is claimed is:

1. A preform for forming a lip of a nacelle defining a complex contour having opposite inner and outer mold line surfaces and defining a center extending along an arc, the preform comprising:
    a first skin member defining a desired convex contour of the outer mold line surface of the lip;
    a second skin member defining a desired convex contour of the inner mold line surface of the lip, the second skin member connected to the first skin member to define a first gas chamber between the first and second skin members;
    a cellular core member disposed in the first gas chamber and defining a plurality of cells between the first and second skin members;
    a gas connection in fluid communication with the first chamber and configured to deliver a pressurized fluid to the first chamber for supporting the core member in the first chamber;
    a closeout member connected to the second skin member by a weld joint, the closeout member positioned opposite the first skin member and defining a second gas chamber between the closeout member and the second skin member with the second skin member defining the desired convex contour of the inner mold line surface of the lip; and
    a gas connection in fluid communication with the second chamber and configured to deliver a pressurized fluid to the second chamber, concurrent with delivery of the pressurized fluid to the first chamber, to urge the preform away from the closeout member and against a contour surface of a die.

2. A preform according to claim 1 further comprising a braze material disposed between the core member and each of the first and second skin members, wherein the core member is bonded to each of the skin members by braze joints comprising the braze material.

3. A preform according to claim 2 wherein at least one of the skin members is formed of a material that is dissimilar to the material of the core member.

4. A preform according to claim 1, wherein the closeout member comprises third and fourth contour skin members connected to define a third gas chamber between the third and fourth contour skin members and a core member disposed in the third gas chamber and defining a plurality of cells between the third and fourth skin members, the third and fourth skin members being joined to the first and second skin members to form the second gas chamber between the first and third skin members.

5. A preform for forming a structural assembly defining a complex contour, the preform comprising:
    a first skin member defining a contour of a first side of the structural assembly;
    a second skin member defining a contour of a second side of the structural assembly, the second skin member connected to the first skin member to define a first gas chamber between the first and second skin members;
    a core member disposed in the first gas chamber and defining a plurality of cells between the first and second skin members;
    a gas connection in fluid communication with the first chamber and configured to deliver a pressurized fluid to the first chamber for supporting the core member in the first chamber;
    a closeout member connected to the second skin member by a weld joint, the closeout member positioned opposite the first skin member and defining a second gas chamber between the closeout member and the second skin member with the second skin member defining the contour of the second side of the structural assembly; and
    a gas connection in fluid communication with the second chamber and configured to deliver a pressurized fluid to the second chamber, concurrent with delivery of the pressurized fluid to the first chamber, to urge the preform away from the closeout member and against a contour surface of a die.

6. A preform according to claim 5 further comprising a braze material disposed between the core member and each of the first and second skin members, wherein the core member is bonded to each of the skin members by braze joints comprising the braze material.

7. A preform according to claim 6 wherein at least one of the skin members is formed of a material that is dissimilar to the material of the core member.

8. A preform according to claim 5, wherein the closeout member comprises third and fourth contour skin members connected to define a third gas chamber between the third and fourth contour skin members and a core member disposed in the third gas chamber and defining a plurality of cells between the third and fourth skin members, the third and fourth skin members being joined to the first and second skin members to form the second gas chamber between the first and third skin members.

9. A perform according to claim 1 further comprising at least one regulation device in fluid communication with the gas connections and configured to control delivery of the pressurized fluid to the first and second chambers such that the second chamber is maintained at a pressure greater than a pressure at which the first chamber is maintained.

10. A perform according to claim 5 further comprising at least one regulation device in fluid communication with the gas connections and configured to control delivery of the pressurized fluid to the first and second chambers such that the second chamber is maintained at a pressure greater than a pressure at which the first chamber is maintained.

* * * * *